United States Patent
Fan et al.

(10) Patent No.: US 7,093,172 B2
(45) Date of Patent: Aug. 15, 2006

(54) SYSTEM AND METHOD FOR DETERMINING ON-CHIP BIT ERROR RATE (BER) IN A COMMUNICATION SYSTEM

(75) Inventors: Nong Fan, Irvine, CA (US); Tuan Hoang, Westminster, CA (US); Hongtao Jiang, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 421 days.

(21) Appl. No.: 10/291,078

(22) Filed: Nov. 8, 2002

(65) Prior Publication Data

US 2004/0030968 A1    Feb. 12, 2004

Related U.S. Application Data

(60) Provisional application No. 60/402,094, filed on Aug. 7, 2002.

(51) Int. Cl.
  *G01R 31/28*  (2006.01)
  *H04L 5/16*  (2006.01)
  *H04L 12/26*  (2006.01)
(52) U.S. Cl. .................. 714/716; 714/704; 375/221; 370/249
(58) Field of Classification Search ............. 714/733, 714/712, 713, 715, 716, 717, 724, 728, 734, 714/735, 738, 739; 375/213, 221; 370/242, 370/246, 249, 903
See application file for complete search history.

(56) References Cited

U.S. PATENT DOCUMENTS 3,916,379 A * 10/1975 Dulaney et al. ............. 714/704
5,787,114 A *  7/1998 Ramamurthy et al. ...... 375/221

(Continued)

OTHER PUBLICATIONS

Definition of an OSI Layer 1 device, at http://en.wikipedia.org/wiki/OSI_model, accessed on Sep. 14, 2005.*

*Primary Examiner*—Guy Lamarre
*Assistant Examiner*—John P. Trimmings
(74) *Attorney, Agent, or Firm*—McAndrews, Held & Malloy, Ltd.

(57) ABSTRACT

A test packet generator (225*a*) within a physical layer device (230) may generate test packets to be communicated over a closed communication path established within the physical layer device (230). The test packets may include a pseudo-random bit sequence. A receiver within the physical layer device (230) may receive at least a portion of the generated test packet. A test packet checker (225*b*) within the physical layer device may compare at least a portion of the received test packets with at least a portion of the generated test packets in order to determine the bit error rate for the physical layer device. A window counter (225*c*) within the physical layer device (230) may count at least a portion of a number of bits received within the generated test packets and a number of bits that are in error in at least a portion of the number of bits received. Accordingly, the bit error rate may be calculated based on a ratio of the number of counted bits in error to the number bits counted in the at least a portion of the number of bits received.

64 Claims, 8 Drawing Sheets

U.S. PATENT DOCUMENTS

| | | | |
|---|---|---|---|
| 5,956,370 A * | 9/1999 | Ducaroir et al. | 375/221 |
| 6,028,845 A * | 2/2000 | Serikawa et al. | 370/249 |
| 6,201,829 B1 * | 3/2001 | Schneider | 375/221 |
| 6,385,236 B1 * | 5/2002 | Chen | 375/224 |
| 6,385,738 B1 * | 5/2002 | Lo | 714/25 |
| 6,693,881 B1 * | 2/2004 | Huysmans et al. | 370/236.1 |
| 6,834,367 B1 * | 12/2004 | Bonneau et al. | 714/738 |
| 2001/0016929 A1 * | 8/2001 | Bonneau et al. | 714/735 |
| 2003/0035473 A1 * | 2/2003 | Takinosawa | 375/224 |
| 2003/0043752 A1 * | 3/2003 | Totsuka et al. | 370/249 |
| 2003/0149921 A1 * | 8/2003 | Lau et al. | 714/704 |

* cited by examiner

SYSTEM AND METHOD FOR DETERMINING ON-CHIP BIT ERROR RATE (BER) IN A COMMUNICATION SYSTEM

CROSS-REFERENCE TO RELATED APPLICATIONS/INCORPORATION BY REFERENCE

This application makes reference to, claims priority to and claims the benefit of U.S. Provisional Patent Application Ser. No. 60/402,094 filed on Aug. 7, 2002.

This application also makes reference to U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13 MM CMOS" filed on Jun. 21, 2002, and U.S. application Ser. No. 60/402,090 entitled "System and Method for Implementing a Single-Chip Having a Multiple Sub-layer PHY" filed on Aug. 7, 2002.

All of the above stated applications are incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Embodiments of the present application relate generally to optical networking hardware, and more particularly to a system and method for performing on-chip bit error rate (BER) testing on a physical layer multimode device.

High-speed digital communication networks over copper and optical fiber are used in many network communication and digital storage applications. Ethernet and Fiber Channel are two widely used communication protocols, which continue to evolve in response to increasing need for higher bandwidth in digital communication systems. The Open Systems Interconnection (OSI) model (ISO standard) was developed to establish standardization for linking heterogeneous computer and communication systems. It describes the flow of information from a software application of a first computer system to a software application of a second computer system through a network medium.

The OSI model has seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Importantly, each OSI layer describes certain tasks which are necessary for facilitating the transfer of information through interfacing layers and ultimately through the network. Notwithstanding, the OSI model does not describe any particular implementation of the various layers.

OSI layers 1 to 4 generally handle network control and data transmission and reception. Layers 5 to 7 handle application issues. Specific functions of each layer may vary depending on factors such as protocol and interface requirements or specifications that are necessary for implementation of a particular layer. For example, the Ethernet protocol may provide collision detection and carrier sensing in the data link layer. Layer 1, the physical layer, is responsible for handling all electrical, optical, opto-electrical and mechanical requirements for interfacing to the communication media. Notably, the physical layer may facilitate the transfer of electrical signals representing an information bitstream. The physical layer may also provide services such as, encoding, decoding, synchronization, clock data recovery, and transmission and reception of bit streams. In high bandwidth applications having transmission speeds of the order of Gigabits, high-speed electrical, optical and/or electro-optical transceivers may be used to implement this layer.

As the demand for higher data rates and bandwidth continues to increase, equipment capable of handling transmission rates of the order of 10 Gigabits and higher is being developed for high-speed network applications. Accordingly, there is a need to develop a 10 Gigabit physical layer device that may facilitate such high-speed serial data applications. For example, XENPAK multi-source agreement (MSA) defines a fiber optical module that conforms to the well-known IEEE standard for 10 Gigabit Ethernet (GbE) physical media dependent (PMD) types. In this regard, XENPAK compatible transceivers may be used to implement the physical layer. Notwithstanding, there is a need for transceivers, which are necessary for implementing 10 Gigabit physical layer applications. The well-known IEEE P802.3ae draft 5 specifications describes the physical layer requirements for 10 Gigabit Ethernet applications and is incorporated herein by reference in its entirety.

An optical-based transceiver, for example, may include various functional components which may implement tasks such as clock data recovery, clock multiplication, serialization/de-serialization, encoding/decoding, electrical/optical conversion, descrambling, media access control (MAC), controlling, and data storage. These functional components may be implemented in a separate chip and/or integrated circuit (IC).

The proliferation of physical layer devices designed to provide high speed communication services will undoubtedly give rise to the need for testing the reliability of any communication links in which these physical layer devices are employed. The testing of communications links may often involve the application of one or more test signals to the inputs of the communication links and capturing the output signals by an external device. The external device may typically store and compare the captured outputs against expected outputs that are known to be accurate. In this regard, defective links or devices comprising the links may be detected when the captured output signals are inconsistent with the expected outputs.

One parameter that may be used to evaluate the reliability of a high speed communication link is bit error rate, which may also be called the bit error ratio (BER). The BER may be defined as a number of erroneous bits divided by the total number of bits transmitted, received, or processed over some stipulated period. When dealing with information, BER may be defined to be the number of erroneous decoded (corrected) bits divided by the total number of decoded (corrected) bits. The BER may usually be expressed as a coefficient and a power of 10. For example, 2.5 erroneous bits out of 100,000 bits transmitted may be represented as 2.5 out of $10^5$ or $2.5 \times 10^{-5}$.

Testing BER for a communication link by applying input signals and capturing of outputs by an external device may become difficult as the data rate of the communication links increase. To effectively simulate operational conditions, the external device must apply the input signals and capture the outputs at the operational data rate of the chip. Testing optical transceivers may be challenging because of the high speeds at which these devices operate. Accordingly, a need exists for achieving BER testing for a physical layer multimode device that may operate at speeds of the order of about 10 Gbps.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

The invention provides a method and system for determining a bit error rate for a physical layer device. The method may include the step of establishing a closed communication path within the physical layer device and generating test packets within the physical layer device to be communicated over the established closed communication path. The test packets comprises a pseudo-random bit sequence. A least a portion of the test packets generated within the physical layer device may be received within the physical layer device. Subsequently, at least a portion of the received test packets may be compared within the physical layer device with at least a portion of the generated test packets in order to determine the bit error rate for the physical layer device.

The generating step may further include the steps of connecting a transmit path of the physical layer device to a receive path of the physical layer device and connecting a receive path of the physical layer device to a transmit path of the physical layer device. The steps of connecting the transmit and the receive paths may further include the step of configuring the physical layer device to operate in an optical or electrical loopback mode. The generating step may further include the step of transmitting the generated test packets from a transmitter within the physical layer device over the closed communication path to a receiver within the physical layer device.

The receiving step may further include the step of counting at least a portion of a number of bits received within the generated test packets. The comparing step may further include the step of counting a number of bits that are in error in the at least a portion of the number of bits received. Accordingly, the bit error rate may be calculated based on a ratio of at least a portion of the number of counted bits that may be in error to the number bits counted in at least a portion of the number of bits received.

In another embodiment of the invention, a machine-readable storage, having stored thereon a computer program having a plurality of code sections executable by a machine for causing the machine to perform the steps for determining a bit error rate for the physical layer device as described above may be provided.

Another embodiment of the invention provides a method for determining a bit error rate for a physical layer device. The method may include the step of establishing a closed communication path between the physical layer device and a remote physical layer device. Test packets may be generated within the physical layer device to be communicated over the established closed communication path. The test packets may include a pseudo-random bit sequence. At least a portion of the test packets from the remote physical layer device may be received within the physical layer device. At least a portion of the received test packets may be compared within the physical layer device with at least a portion of the generated test packets, to determine the bit error rate for the physical layer device. The establishing step may further include the step of connecting an output of the physical layer device to an input of the remote physical layer device and an output of the remote physical layer device to an input of the physical layer device.

The connecting step may further include the step of connecting a transmit path of the physical layer device to a receive path of the remote physical layer device and connecting a receive path of the physical layer device to a transmit path of the remote physical layer device. The remote physical layer device may be configured to operate in an electrical or optical loopback mode. The generating step may further include the step of transmitting the generated test packets from a transmitter within the physical layer device over the closed communication path to the remote physical layer device.

The receiving step may further include the step of receiving at a receiver within the physical layer device, at least a portion of the generated test packets from a transmitter within the remote physical layer device over the closed communication path and counting a number of bits in at least a portion of the generated test packets received at the receiver. The comparing step may further include the step of counting a number of bits that are in error in at least a portion of the number of bits received at the receiver. Accordingly, the bit error rate may be calculated based on a ratio of the number of counted bits in error to the number bits counted in the at least a portion of the number of bits received at the receiver.

In another embodiment of the invention, a machine-readable storage, having stored thereon a computer program having a plurality of code sections executable by a machine for causing the machine to perform the steps for determining a bit error rate for the physical layer device as described above may be provided.

In a further embodiment of the invention, a system for determining a bit error rate for a physical layer device may be provided. The system may include means establishing a closed communication path within the physical layer device and means for generating test packets within the physical layer device to be communicated over the established closed communication path. Means for receiving at least a portion of the generated test packets within the physical layer device and means for comparing within the physical layer device, at least a portion of the received test packets with at least a portion of the generated test packets in order to determine the bit error rate for the physical layer device may also be provided.

The generating means may further include means for connecting a transmit path of the physical layer device to a receive path of the physical layer device and means for connecting a receive path of the physical layer device to a transmit path of the physical layer device. The means for connecting the transmit path and the means for connecting the receive path may further include means for configuring the physical layer device to operate in an optical loopback mode. The means for connecting the transmit path and the means for connecting the receive path may further include means for configuring the physical layer device to operate in an electrical loopback mode.

The generating means may further include means for transmitting the generated test packets from a transmitter within the physical layer device over the closed communication path to a receiver within the physical layer device. The test packets may include a pseudo-random bit sequence. The receiving means may further include means for counting at least a portion of a number of bits received within the generated test packets. The comparing means may further include means for counting a number of bits that are in error in at least a portion of the number of bits received. Accordingly, means for calculating the bit error rate may calculate the bit error rate based on a ratio of the number of counted bits in error to the number bits counted in the at least a portion of the number of bits received.

In still a further embodiment of the invention, the invention may also provide a system for determining a bit error rate for a physical layer device. The system may include means for establishing a closed communication path between the physical layer device and a remote physical layer device and means for generating test packets within the physical layer device to be communicated over the established closed communication path. The test packets may include a pseudo-random bit sequence. Means for receiving at least a portion of the test packets from the remote physical layer device within the physical layer device and means for comparing within the physical layer device, at least a portion of the received test packets with at least a portion of the generated test packets, to determine the bit error rate for the physical layer device may also be provided. The establishing step may further include means for connecting an output of the physical layer device to an input of the remote physical layer device and an output of the remote physical layer device to an input of the physical layer device.

The connecting means may further include means for connecting a transmit path of the physical layer device to a receive path of the remote physical layer device and means for connecting receive path of the physical layer device to a transmit path of the remote physical layer device. The system may further include means for configuring the remote physical layer device to operate in an electrical loopback mode or an optical loopback mode. The generating means may further include means for transmitting the generated test packets from a transmitter within the physical layer device over the closed communication path to the remote physical layer device.

The receiving means may further include means for receiving at a receiver within the physical layer device, at least a portion of the generated test packets from a transmitter within the remote physical layer device over the closed communication path. Means for counting a number of bits in at least a portion of the generated test packets received at the receiver may also be provided. The comparing means may further include means for counting a number of bits that are in error in at least a portion of the number of bits received at the receiver. Accordingly, means for calculating the bit error rate based on a ratio of the number of counted bits in error to the number bits counted in the at least a portion of the number of bits received at the receiver may also be provided.

In another embodiment of the invention, a system for determining a bit error rate for a physical layer device may also be provided. The system may include a test packet generator within the physical layer device for generating test packets to be communicated over a closed communication path established within the physical layer device. The test packets may include a pseudo-random bit sequence. A receiver for receiving at least a portion of the generated test packets within the physical layer device may also be included. A test packet checker within the physical layer device may be configured to compare at least a portion of the received test packets with at least a portion of the generated test packets in order to determine the bit error rate for the physical layer device.

A loopback interface may be provided for connecting a transmit path of the physical layer device to a receive path of the physical layer device and for connecting a receive path of the physical layer device to a transmit path of the physical layer device. The loopback interface may be an optical or electrical loopback interface. In one aspect of the invention, at least one bit in a memory cell or register may be used to configure the loopback interface. A counter within the physical layer device may be configured to count at least a portion of a number of bits received within the generated test packets, counting a number of bits that are in error in at least a portion of the number of bits received. The bit error rate may be calculated according to a ratio of the number of counted bits in error to the number bits counted in the at least a portion of the number of bits received.

Another embodiment of the invention may also provide a system for determining a bit error rate for a physical layer device. A test packet generator within the physical layer device may generate test packets to be communicated over a established closed communication path between the physical layer device and a remote physical layer device. The test packets may include a pseudo-random bit sequence. A receiver within the physical layer device may receive at least a portion of the test packets from the remote physical layer device. A test packet checker within the physical layer device may compare at least a portion of the received test packets with at least a portion of the generated test packets to determine the bit error rate for the physical layer device.

The system may further include an interface for connecting an output of the physical layer device to an input of the remote physical layer device and an output of the remote physical layer device to an input of the physical layer device. The interface may be an optical interface, an electrical interface, or an optical-electrical interface. The remote physical layer device may further include a loopback interface having at least one bit for configuring the remote physical layer device to operate in a loopback mode. A counter within the physical layer device may be configured to count at least a portion of a number of bits received within the generated test packets and a number of bits that are in error in at least a portion of the number of bits received. Accordingly, the bit error rate may be calculated based on a ratio of the number of counted bits in error to the number bits counted in at least a portion of the number of bits received.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4b is a flow chart describing exemplary steps that may be used to determine bit error rate in accordance with the embodiment of the invention as described in FIG. 4a.

DETAILED DESCRIPTION

Figure 1:
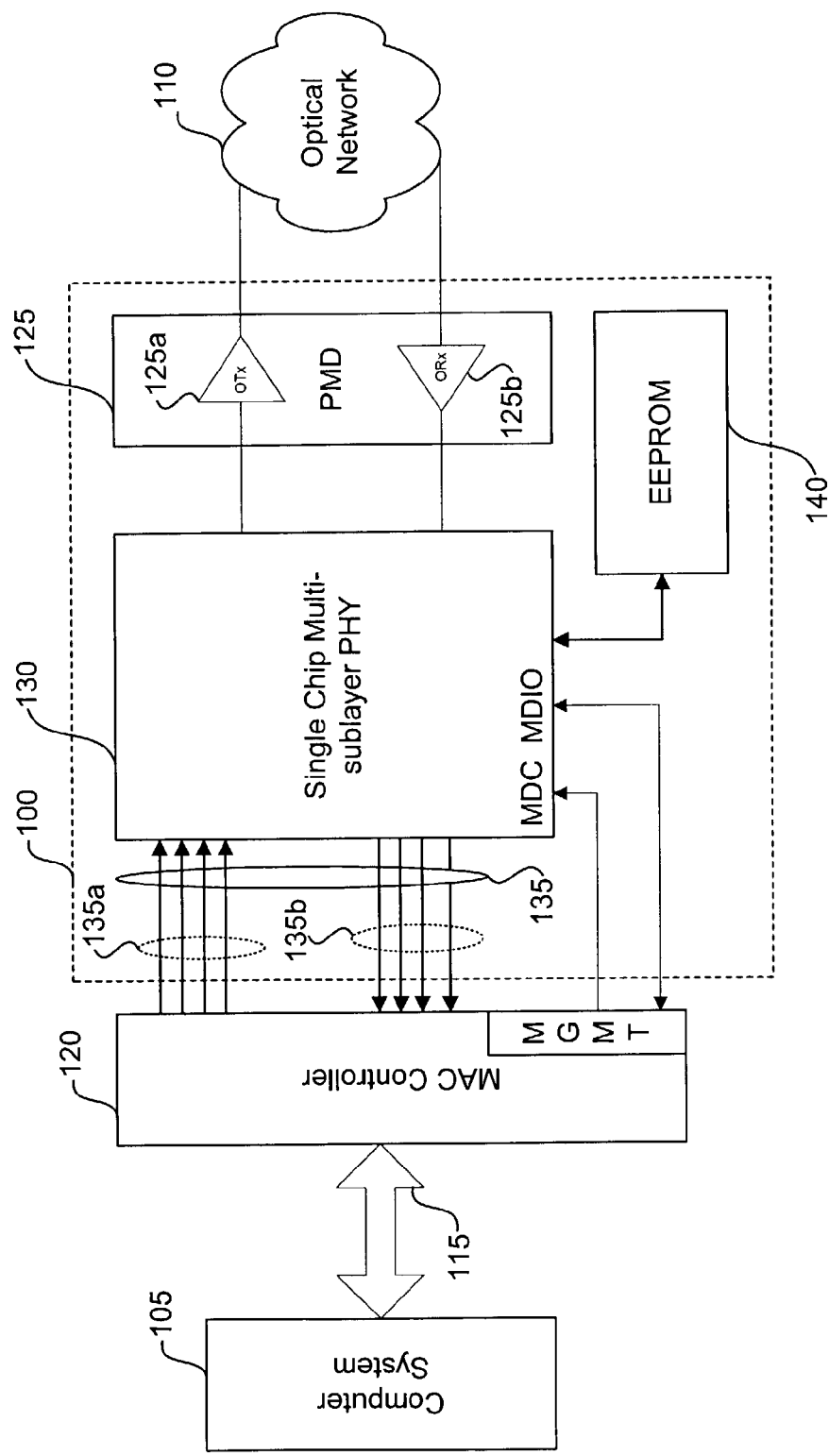
FIG. 1 is a block diagram of an exemplary transceiver module in accordance with one aspect of the invention.

FIG. 1 is a block diagram of an exemplary transceiver module 100 in accordance with one aspect of the invention. Referring to FIG. 1, there is also illustrated a computer system 105, a MAC controller 120, a MAC controller interface 115, an optical network 110, a single-chip multimode multi-sublayer PHY device 130, an electrically erasable programmable read only memory (EEPROM) 140, an PMD transmitter 125a and an PMD receiver 125b. PMD transmitter 125a and PMD receiver 125b may be integrated into a single PMD 125 such as a chip or IC, although the invention is not limited in this regard. Transceiver module 100 may be an integrated device, which may include the single-chip multimode multi-sublayer PHY device 130, the EEPROM 140, the optical transmitter 125a and the optical receiver 125b. Computer system 105 may interface with MAC controller 120 through the medium access controller interface 115 and may communicate with the optical network 110 through the transceiver module 100.

Transceiver module 100 may be configured to communicate, namely transmit and receive, data between a computer system 105 and an optical network 110. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1 provides services to layer 2 and layer 2 provides services to layer 3. The data link layer, layer 2, may include a medium access control (MAC) layer whose functionality may be handled by a MAC controller 120. MAC controller 120 may be interfaced to computer system 105 via the MAC interface 115. In this regard, MAC controller 120 may be configured to implement the well-known IEEE 802.3ae Gigabit Ethernet protocol.

In the arrangements of FIG. 1, the computer system 105 may represent the layer 3 and above, the MAC controller 120 may represent layer 2 and above and the transceiver module 100 may represent layer 1. The computer system 105 may be configured to build the five highest functional layers for data packets that are to be transmitted over the optical network 110. Since each layer in the OSI model may provide a service to the immediately higher interfacing layer, the MAC controller 120 may provide the necessary services to the computer system 105 to ensure that packets are suitably formatted and communicated to the transceiver module 100. During transmission, each layer may add its own header to the data passed on from the interfacing layer above it. However, during reception, a compatible device having a similar OSI stack may strip off the headers as the message passes from the lower layers up to the higher layers.

The transceiver module 100 may be configured to handle all the physical layer requirements, which may include, but is not limited to, packetization, serialization/deserialization (SERDES) and data transfer. Transceiver module 100 may operate at a plurality of data rates, which may include 10 Gbps. Data packets received by the transceiver module 100 from MAC controller 120 may include data and header information for each of the above six functional layers. The transceiver module 100 may be configured to encode data packets that are to be transmitted over the optical medium of the optical network 110. The transceiver module 100 may also be configured to decode data packets received from the optical network 110.

The MAC controller 120 may interface with the single-chip multimode multi-sublayer PHY 130 of the transceiver module 100 through a 10 Gbps Ethernet attachment unit interface (XAUI) 135. The XAUI 135 may be a low pin count device having a self-clocked bus, which directly evolved from lower data rate protocols. The XAUI may function as an extender interface for a 10 Gigabit media independent interface (XMGII). The XAUI 135 may utilize a plurality of serial data lanes on each of its receive 135a and transmit 135b interfaces to achieve compatible 10 GbE operational speeds. Notably, the XAUI 135 may be configured as two, 4-bit interfaces, each with four serial lines, thereby achieving about 10 Gbps throughput. In accordance with the embodiments of FIG. 1, XAUI 135a may be configured to transmit data from the MAC controller 120 to the single-chip multimode multi-sublayer PHY 130. Additionally, XAUI 135b may be configured to transmit data from the single-chip multimode multi-sublayer PHY 130 to the MAC controller 120.

The single-chip multimode multi-sublayer PHY 130 may support multiple modes of operation. In this regard, the single-chip multimode multi-sublayer PHY 130 may be configured to operate in one or more of a plurality of communication modes. Each communication mode may implement a different communication protocol. These communication modes may include, but are not limited to, 10 GbE, fibre channel and other similar protocols. The single-chip multimode multi-sublayer PHY 130 may be configured to operate in a particular mode of operation upon initialization or during operation.

The single-chip multimode multi-sublayer PHY 130 may also include a fully integrated serialization/deserialization device, which may be configured to operate at speeds of 10 Gbps. During transmission, the single-chip multimode multi-sublayer PHY 130 may serialize the data received over the 4-bit XAUI 135a and transmit the data in a format such as a single 10 Gbps stream to the PMD transmitter 125a. During reception, the single-chip multimode multi-sublayer PHY 130 may de-serialize a single 10 Gbps signal from the PMD 125 and transmit the data in a format such as a 4-bits×3.125 Gbps datastream over XAUI 135b.

The PMD 125 may include at least one PMD transmitter 125a and at least one PMD receiver 125b. In operation, PMD 125 may be configured to received data from and transmit data to the optical network 110. The PMD transmitter 125a may transmit data originating from the computer system 105 over the optical network 110. The PMD receiver 125b may receive data destined for computer system 105 from the optical network 110 and transmit the data to the computer system 105. The PMD 125 may also be configured to function as an electro-optical interface. In this regard, electrical signals may be received by PMD transmitter 125a and transmitted in a format such as optical signals over the optical network 110. Additionally, optical signals may be received by PMD receiver 125b and transmitted as electrical signals to the computer system 105.

The transceiver module 100 may also include an EEPROM 140. EEPROM 140 may be programmed with information including parameters and/or code that may effectuate the operation of the single-chip multimode multi-sublayer PHY 130. The parameters may include configuration data and the code may include operational code such as firmware, although it should be recognized that the information is not limited in this regard.

Figure 2:
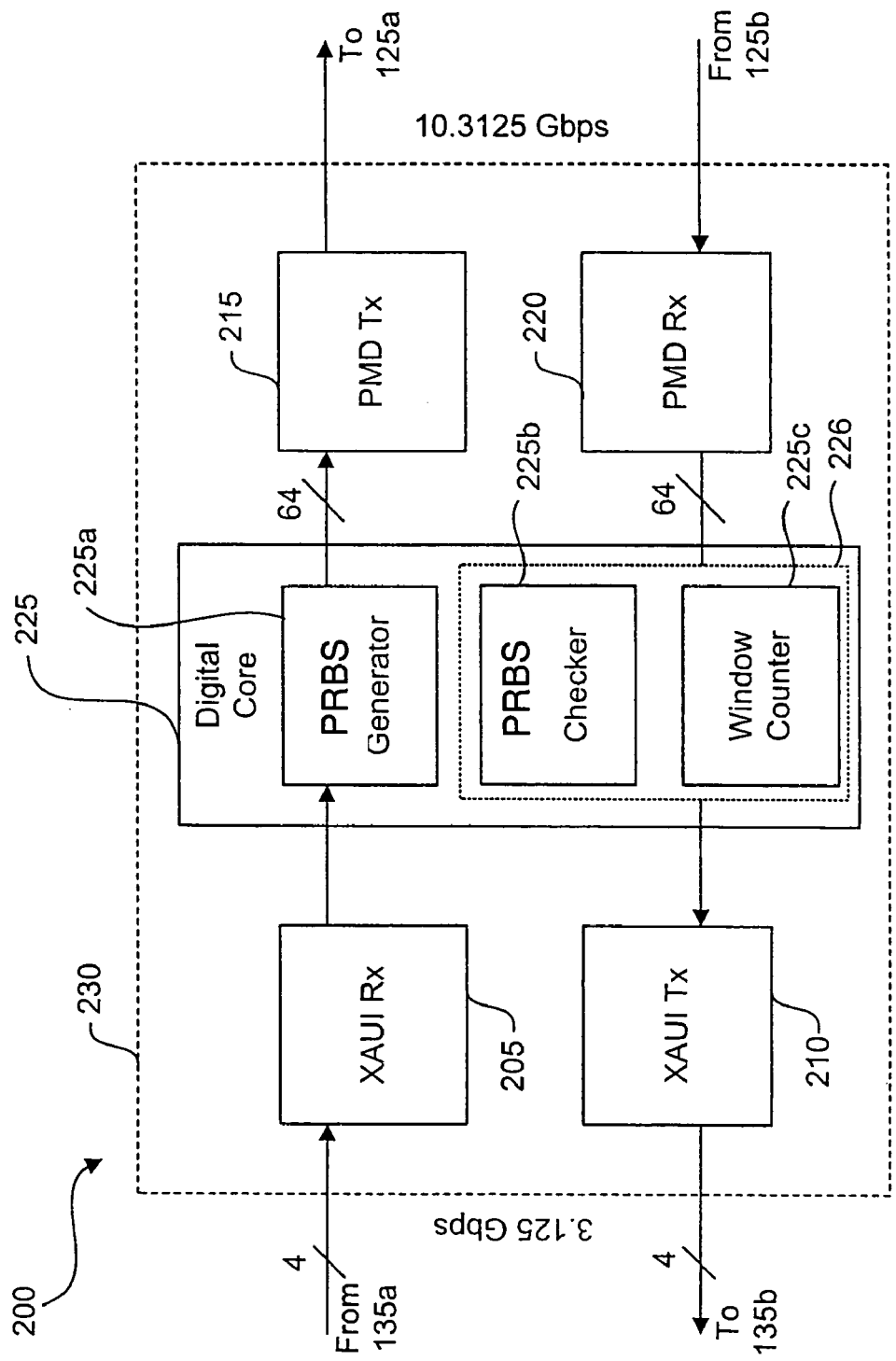
FIG. 2 is a block diagram of an exemplary single-chip multimode multi-sublayer PHY in accordance with one embodiment of the invention.

FIG. 2 is a block diagram 200 of an exemplary single-chip multimode multi-sublayer PHY 230 in accordance with one embodiment of the invention. Referring to FIG. 2, the single-chip multimode multi-sublayer PHY 230 may include a XAUI receiver 205, a XAUI transmitter 210, a PMD transmitter 215, and a PMD receiver 220 for receiving and transmitting data. A digital core 225 may also include a pseudo-random bit sequence (PRBS) generator 225a, a PRBS checker 225b and a window counter 225c. The PRBS checker 225b and the window counter 225c may be embodied in a single unit 226 within digital core 225 although the invention is not limited in this regard. Similarly, although the PRBS generator 225a and the PRBS checker 225b are shown integrated within the digital core 225, the invention is not limited in this regard. In an alternative embodiment, the PRBS generator 225a and the PRBS checker 225b may be integrated within the PMD transmitter 215 and the PMD receiver 220, respectively.

In operation, the digital core 225 of the single-chip multimode multi-sublayer PHY 230 may be configured to serialize/deserialize received data. Data from the XAUI 135a may be received at XAUI receiver 205, serialized by the digital core 225, and transmitted in a format such as a single 10 Gbps datastream by the PMD transmitter 215. This may be considered the transmit path. Data from the PMD receiver 125b may be received at PMD receiver 220, deserialized by the digital core 225, and transmitted in a format such as a 4-bit×3.125 Gbps streams by the XAUI receiver 210. This may be considered the receive path.

The PRBS generator 225a, the PRBS checker 225b, and the window counter 225c may be configured to facilitate on-chip bit error rate testing. The PRBS generator 225a may be configured to generate $2^{31}-1$ PRBSs. The PRBS checker 225b may maintain a copy of the PRBS, known as the expected bit stream, and may compare at least a portion of a received bit stream to at least a corresponding portion of the expected bit stream. When comparing the received bit stream to the expected bit stream, the PRBS checker 225b may determine the bit errors that are in the received bit stream. In this regard, the PRBS checker may count the number of bits that are in error in the bit stream. The window counter 225c may be configured to count the number of bits in the bit stream. A bit error rate may be determined according to the number of bit errors counted by the PRBS checker 225b and the number of bits in the received bit stream, using the following formula:

$$BER = [\text{Number of Bit Errors Counted}]/[\text{Number of Bits in Bit Stream}]$$

The window counter 225c may be configured to control the length of the test, namely the number of bits in the bit stream that may be tested. In one embodiment of the invention, the window counter 225c may be implemented as a register or other memory-based device, which may be programmed with number of bits to be tested. The number of bits to be tested may constitute the window size. In this case, the number of bits identified by the window counter may be decremented in response to receipt of a bit in the received bit stream. The testing may be terminated when the register is decremented to a count of zero.

In an alternative embodiment, the window counter may be implemented as a programmable mask in which a register may be initialized to zero. The mask may be programmed with the number of bits for testing, namely the window size, and the register may be incremented upon receipt of each bit. When the register matches the programmable mask, the test may be terminated. The range for the programmable register or mask may be selected so that it is large enough to allow for a statistically significant number of bits for testing. For example, a 45-bit range would permit testing of 35.2 Tb, or approximately 10 hours of testing at 10 Gbps. In one embodiment of the invention, the window counter 225c may be programmed with the number of bits to be tested from a memory location in EEPROM 140. In this regard, the number of bits may be read from the EEPROM 140 and written into a register or mask of the window counter 225c.

Figure 3:
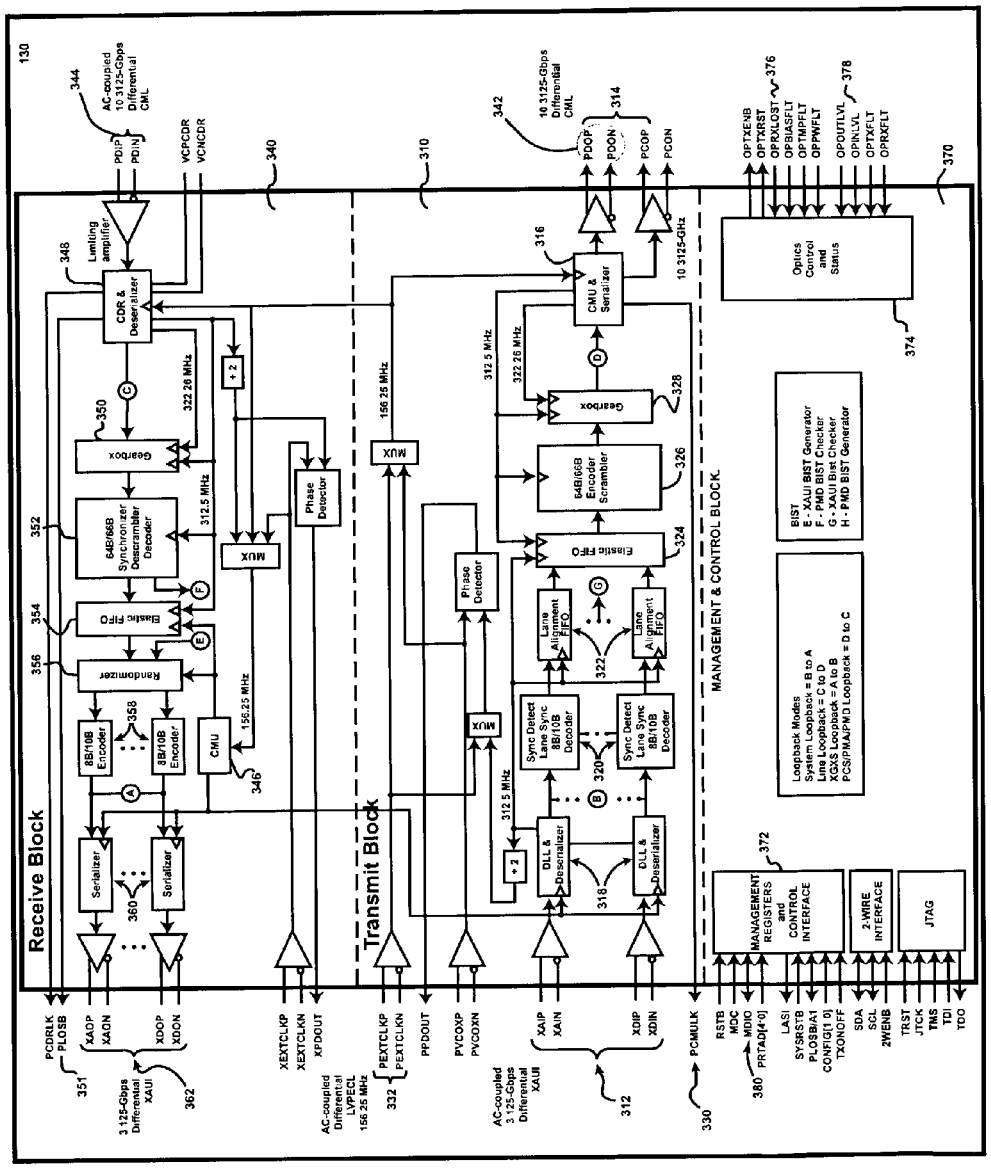
FIG. 3 is a schematic block diagram illustrating an embodiment of the single-chip multimode multi-sublayer PHY 130 of FIG. 2 in accordance with an embodiment of the invention.

FIG. 3 is a schematic block diagram illustrating an embodiment of the single-chip multimode multi-sublayer PHY 130 of FIG. 2 in accordance with an embodiment of the invention. FIG. 3 may provide a more detailed schematic block diagram of the single-chip multimode multi-sublayer PHY 230 of FIG. 2, which may be used in the transceiver module 100 of FIG. 1. Referring to FIG. 3, the single-chip multimode multi-sublayer PHY 230 may include three main functional blocks. Namely, a transmit block 310, a receive block 340, and a management and control block 370. Clock interfaces may be provided for configuring the XAUI and PMD interfaces for operating in a synchronous mode or an asynchronous mode.

The transmit block 310 may include a clock multiplier unit (CMU) and serializer block 316, a gearbox 328, an encoder scrambler block 326, at least one elastic FIFO 324, one or more lane alignment FIFOs 322, one or more lane detect lane sync decoders 320, and one or more DLL and deserializer 318. The receive block 340 may include a CDR deserializer 348, a gearbox 350, a synchronizer descrambler decoder block 352, at least one elastic FIFO 354, a randomizer 356, one or more encoders 358, one or more serializers 360 and a CMU 346. The management and control block 370 may include a management registers and control interface block 372 and an optics and control status block 374.

In operation, the transmit block 310 may be configured to receive data formatted in a format such as a 4-lane 3 Gigabit data at the XAUI receivers 312 and reformat the received data in a format suitable for 10 Gigabit serial transmission at the PMD differential CML drivers 314. The PMD CMU and serializer 316 in the PMD TX/RX sublayer may be configured to be phase-locked (PL) to a reference clock such as an external reference clock. In one aspect of the invention, each of the XAUI receivers 312 may be configured to handle one lane of received data. In this regard, each of the XAUI receivers 312 in the XAUI TX/RX sublayer may include an internal delayed-lock loop (DLL), which may be adapted to synchronize the sampling clock signal to any incoming data signal.

A PLL is an electronic circuit that may be configured to control and frequency source such as an oscillator, so that it maintains a constant phase angle relative to a reference signal. The reference signal may be extracted from a received signal. PLLs may be used in applications such as, bit synchronization, symbol synchronization, and coherent carrier tracking. An exemplary digital PLL (DPLL) circuit may include a serial shift register, a phase corrector circuit and a local clock signal. The serial shift register may be configured to receive digital input samples. The digital input samples may be extracted from the received signal. Preferably, the local clock signal may be stable enough to supply clock pulses that may drive the serial shift register. The phase corrector circuit may be adapted to take the local clock signal and regenerate a stable clock signal that may be in phase with the received signal. In this regard, the phase corrector circuit may be configured to slowly adjust the phase of the regenerated clock signal to match the received signal. The regenerated clock signal may be utilized to sample the received data and determine the value of each received bit.

In operation, the received signal may be sampled at the local clock rate. This may generally be a multiple of the nominal regenerated clock frequency such as 32 times. Each sample, whether (0) or one (1), may be shifted into the shift register. The need to adjust the phase may be determined by viewing a set of samples of the received signal. At each regenerated bit period, the shift register may be consulted. If the center of the received bit lies at the center of the shift register, the two clocks may be deemed to be in phase and no compensation or adjustment may be necessary. If the regenerated clock signal lags the reference signal, then the phase adjuster may provide compensation by advancing the regenerated clock. If the regenerated clock signal leads the reference signal, then the phase adjuster may provide compensation by retarding the regenerated clock.

Accordingly, after synchronization, a 3 Gigabit sampling clock signal, for example, may be configured to sample the data signal in the center of a data eye pattern. In this arrangement, a phase relationship between the edge transitions of the data signal and those of the sampling clock signal may be determined and compared by a phase/frequency discriminator. Output pulses from the discriminator may indicate the direction that may be required for adequately correcting a phase of the signal. Additionally, a loop filter may be configured to smooth any pulses that may occur in the signal. An output signal generated by the loop filter may be adapted to control one or more internal phase interpolators, which may be used to generate the sampling clock. The XAUI CMU 316 may be adapted to function as a phase locked loop (PLL) within the XAUI TX/RX sublayer and may be configured to generate clocks for internal DLL phase interpolations.

The single-chip multimode multi-sublayer PHY 130 may include one or more loss-of-signal (LOS) detect circuits. In one embodiment of the invention, the single-chip multimode multi-sublayer PHY 130 may be configured to include a loss-of-signal (LOS) detect circuit for each XAUI DLL within the XAUI TX/RX sublayer. In this regard, the LOS detect circuits may be configured to monitor and detect data presence at the XAUI receiver inputs 312. A minimum single-ended input signal swing may be used for a valid phase lock condition although the invention is not so limited.

The status of each individual LOS detector may be determined from one or more bits and/or internal register of the single-chip multimode multi-sublayer PHY 130.

In one aspect of the present invention, the XAUI serial inputs 312 for the transmit block 310 of the XAUI TX/RX sublayer may be AC-coupled. In this regard, AC coupling may prevent voltage drops across input devices of the single-chip multimode multi-sublayer PHY 130 whenever the input signals may be sourced from a higher operating voltage device. In a case where DC coupling may be used, it may be necessary to ensure that the input signals do not exceed certain $V_{DD}$ levels. Additionally, noise due to overshooting and undershooting of transient currents may also be appropriately handled.

Each XAUI serial data stream for the XAUI serial inputs 312 may be deserialized by one of the DLL and de-serializers 318 integrated within the XAUI TX/RX sublayer. DLL and de-serializers 318 may include one or more serial-to-parallel converters that may be adapted to create, for example, a 10-bit word from the receive serial input data stream. DLL output clocks may be provided and configured to drive the serial-to-parallel converters and/or DLL and de-serializer 318. In normal operation, the DLL may recover the clock from the input data signal. In a case where no data is present, the clock may be recovered from an internal reference clock. In this regard, the output may be sent to the XGXS PCS sublayer in the digital core 225 (FIG. 1).

The XGXS PCS sublayer may include a synchronization (SYNC) sub-block. The sync acquisition sub-block in the XGXS PCS sublayer may be configured to perform code group synchronization, for example, on the incoming 10-bit bytes resulting from the DLL & deserializer 318. A two-stage 10-bit shift register may be configured to recognize a valid boundary of the input data stream. For example, the two-stage 10-bit shift register may be configured to recognize a /COMMA/(K28.5) code group, which may be used to indicate a valid data boundary. In this case, upon detection of a single/COMMA/, or other suitable boundary, at least one of the 8B/10B decoders 320 may be enabled. Upon detection of four /COMMA/ code groups without any intervening invalid code group errors, a sync acquisition may be declared.

The 8B/10B decoders 320 may be configured to perform error checks, which may include, but are not limited to, illegal code checks, disparity checks and invalid code checks. In one aspect of the invention, both an illegal code and a running disparity error may cause an invalid code. In this case, an invalid code counter, which may be maintained for performance monitoring, may be incremented. The invalid code counter may be cleared upon a read access or other suitable method. The 8B/10B decoders 320 may also be configured to handle certain decoding tasks within the XGXS PCS sublayer.

A difference between the number of 1's and 0's in a block of data may be characterized as a running disparity (RD). A RD may be regarded as being positive when there are more ones (1s) than zeros (0s) and negative when there are more zeros (0s) than ones (1s). In an exemplary encoding scheme, each encoded 10-bit word may be assigned a RD of 0, +2, or −2, in order to ensure a high bit transition density for reliable clock recovery. Additionally, the RD encoding may be alternated for DC balancing. The balancing may be achieved by maintaining an equal number of ones (1s) and zeros (0s). Upon receipt of an invalid code, a decoder may replace the invalid code with an error code (/E/) K30.7, and may increment the invalid code counter. Upon receipt of a legitimate error code, /E/, one or more of the 8B/10B decoders 320 may pass the error to the XGXS PCS sublayer without incrementing the invalid counter.

Each of the outputs of the 8B/10B decoders 320 may be coupled to a corresponding one of a plurality of lane alignment FIFOs 322. Each lane assignment FIFO 322 may have a corresponding read and write pointer. In operation, at the start of lane alignment by each of, for example, four lane alignment FIFOs 332, the four Lane Alignment FIFO write-pointers within the XGXS PCS sublayer may be enabled upon detection of a boundary, such as an /A/. The FIFOs common read-pointer may be enabled when all four XAUI lanes have detected /A/. Upon detection of an /A/ in one lane without /A/ detections in the other three lanes within a programmable window or skew budget, all FIFOs may be reset, thereby forcing the lane alignment process to start over again. The lane Alignment FIFOs 322 may be adapted to support lane skew compensation of, for example, 5 byte-clocks. Notwithstanding, in accordance with the invention, the single-chip multimode multi-sublayer PHY 130 may permit about 21 external UIs in compliance with the IEEE 802.3ae standard.

The PMD PCS sublayer may utilize a transmission code to improve the transmission characteristics of information, which may be transferred across a communication link. The transmission code may also support transmission of control and data characters. In this regard, the single-chip multimode multi-sublayer PHY 130 may be configured to support 64B/66B encoding as defined by IEEE 802.2ae clause 49 for transmission code. Advantageously, this may ensure the existence of sufficient synchronization information in bit stream to make clock recovery more robust at the receiver.

The output of the lane alignment FIFOs 322 may be coupled to at least one elastic FIFO 324. The output of the at least one elastic FIFO 324 may be coupled to an encoder scrambler block 326. The output of the encoder scrambler block 326 may be coupled to a TX gearbox 328 embedded in the PMD PCS sublayer. The fame synchronizer function of the encoder scrambler block 326 may be configured to encode, for example, a 66-bit frame boundary within the received data. This may permit the fame synchronizer function of the frame synchronizer descrambler decoder block 352 to lock to a 66-bit block using a sync header of the 66-bit frame boundary. In one aspect of the invention, the encoder scrambler block may be configured to encode the blocks of data in accordance with the IEEE 802.3ae specification.

The TX gearbox 328 in the PMD POS sublayer may be adapted to function as a buffer that may convert, for example, 64-bit data to 66-bit data for more efficient serialization. In one aspect of the invention, the TX gearbox 328 may be configured to receive 64-bit data from the scrambler 326 and a 2-bit sync from a type generator at a frequency such as 156.25 MHz. The TX gearbox 328 may produce a 66-bit data output at a frequency such as 322.265 MHz to the PMD CMU and serializer 316 within the PMD TX/RX sublayer. A register bank may be employed which may be accessed in a circular manner. In this regard, data may be read out of the TX gearbox 328 using an internally generated clock signal such as a 322.265 MHz clock. The data may be converted to a 10 Gigabit serial stream within PMD TX/RX sublayer and driven off-chip by the differential CML outputs 314. In one embodiment of the invention, bit zero (0) of frame zero (0) or the least significant bit (LSB), may be shifted out first. The PMD CMU and serializer 316 within the PMD TX/RX sublayer may have a PLL that may be configured to generate a 10 Gigabit clock by multiplying for example, the internal 156.25 MHz reference clock.

The single chip multimode multi-sublayer PHY 130 may also include a lock detect circuit. The lock detect circuit may be configured to monitor the frequency of any internal VCO. The status of the lock detect may be indicated by one or more bits and/or registers, for example bit zero (0) of an analog transceiver status register (ATSR). A register bit such as a P_LKDTCMU bit may also be configured to transition to a high state whenever the PMD CMU PLL is phase locked. The CMU lock detect signal may also be provided as an output status at the PCMULK pin 348.

The CML serial outputs 314, namely PCOP, PCON, PDOP and PDON may be AC-coupled or DC-coupled. A source voltage of about +1.8V may power the CML outputs 314. Various pins on single-chip multimode multi-sublayer PHY 130 may be configured to provide power to the PCOP, PCON, PDOP and PDON CML serial outputs 314. The PCOP, PCON, PDOP and PDON CML serial outputs 314 may be adapted as high-speed CML outputs that may include a differential pair designed to drive, for example, a 50 Ω transmission line. An output driver may be back terminated to, for example, a 50 Ω on-chip resistor, in order to provide snubbing of any signal reflections.

Management and control block 370 may include suitable control logic and circuitry for controlling management functions of the single-chip multimode multi-sublayer PHY 130. For example, management registers and control interface block 372 may include one or more registers that may be configured to deactivate the optical transmitter in the optical PMD 125a. Deactivation may be achieved, for example, by transmitting a constant logical low level (0) at the output of PMD 125. A polarity of PDIP, PDIN 344 and PDOP, PDON 342 may be reversed in order to accommodate difficult printed circuit board (PCB) layouts. In this regard, each differential signal pair may have its own polarity control bit in the PMD/Optics Digital Control Register 374.

In accordance with the invention, the single-chip multimode multi-sublayer PHY 130 may comply with the jitter specifications proposed for 10 Gbps Ethernet equipment as defined by IEEE 802.3ae standards. Furthermore, the reference clock characteristics may also be adapted to adhere to this standard although the invention is not so limited.

In operation, receiver block 340 may be configured to receive 10 Gigabit serially formatted PMD data. Upon receipt of the serially formatted data, receiver block 340 may reformat the data for transmission in a suitable format such as a 4-lane 3 Gigabit format by XAUI transmitter 210 (FIG. 2). One of the 3 Gigabit CMU clocks, for example, CMU 346 in the XAUI TX/RX sublayer may be adapted to retune some or all of the XAUI transmitters. The XAUI CMU 346 in the XAUI TX/RX sublayer may be phase-locked to, for example, an external reference clock.

The PMD clock and data recovery (CDR) and serializer 348 within the PMD TX/RX sublayer may be configured to generate a clock signal having, for example, the same frequency as the incoming data bit rate (10 Gigabit rate) at the CML serial data inputs, PDIP and PDIN 344. In this regard, the clock may be phase-aligned by a PLL so that it samples the data in the center of the data eye pattern.

The phase relationship between the edge transitions of the data and those of the generated clock may be compared by a phase/frequency discriminator. In this arrangement, a phase relationship between the edge transitions of the data signal and those of the sampling clock signal may be determined and compared by a phase/frequency discriminator. Output pulses from the discriminator may indicate the direction that may be required for adequately correcting a phase of the signal. Additionally, a loop filter may be configured to smooth any pulses that may occur in the signal. An output signal generated by the loop filter may be adapted to control one or more internal phase interpolators, which may be used to generate the sampling clock. The output of the loop filter may control the frequency of the VCO, which may generate the recovered clock. Frequency stability without incoming data may be guaranteed, for example, by an internal reference clock. In this case, the internal reference clock may provide an appropriate clock to which the PLL may lock whenever there is a loss of data signal.

The single-chip multimode multi-sublayer PHY 130 may also include a lock detect circuit that may be adapted to monitor the 10 Gigabit frequency of any internal VCO within the PMD TX/RX sublayer. In one embodiment of the invention, the frequency of the incoming data stream may be configured to be within, for example, ±100 ppm of the 10 Gigabit data stream for the lock detector to declare a signal lock. The lock detect status may be indicated by one or more bits and/or registers, for example, bit zero (0) of the ATSR. In this case, the P_LKDTCDR bit may be configured to transition to a high state whenever the PMD CDR is locked to the incoming data. The CDR lock detect signal may also be provided as an output status at the PCDRLK pin 364.

The single-chip multimode multi-sublayer PHY 130 may also include a LOS detect circuit that may be configured to monitor the integrity of the serial receiver data path in the PMD TX/RX sublayer. A peak detector may be configured to look for a minimum amplitude swing in the signal. In a case where there is no serial data input present, a bit such as a LOS_P bit in the ATSR may be set to zero (0). In one aspect of the invention, during operation, the CDR and deserializer block 348 may attempt to lock to the reference clock whenever the signal level falls below a minimum amplitude swing and a bit such as a LOS_B bit may be set accordingly. The LOS from a peak detector condition may also be reflected at the PLOSB output signal pin 351.

The optics control and status block 374 may be adapted to include at least one OPRXLOS pin 376. The OPRXLOS input pin 376 in the optics control and status block 374 may be utilized by an external optical receiver's LOS monitor to indicate when there is loss-of-light condition. The OPRXLOS pin 376, whether directly or in combination with the peak detector logic, may be configured to force the CDR to lock to the reference clock. A polarity of the OPRXLOS pin 376 may be programmable through one or more bits and/or registers. For example, an OPINLVL pin 378 may be adapted to control a OPINLVL bit in a PHY identifier register. In accordance with an embodiment of the invention, the OPINLVL bit may be configured to change the polarity of OPRXLOS pin 376.

The PMD CML serial inputs PDIP, PDIN 344 on the single-chip multimode multi-sublayer PHY 130 may be AC-coupled. Advantageously, AC coupling may prevent voltage drops across input devices of the single-chip multimode sublayer PHY 130 when the input signals are sourced from a higher operating voltage device. In a case where DC coupling is used, it may be pertinent to ensure that input signals do not exceed certain $V_{DD}$ levels. Additionally, it may be necessary to compensate for noise due to overshoot and undershoot transients.

The PMD serial data stream may be deserialized to, for example, a 66-bit word format by, for example, a serial-to-parallel converter in the PMD TX/RX sublayer such as CDR and deserializer block 348. An output CDR and deserializer block 348 may provide a clock signal necessary for operation of the serial-to-parallel converter. Under normal operation, the CDR and deserializer block 348 may be configured to recover the clock from the data signal. If there is no data present, the clock may be recovered from a reference clock such as an internal reference clock. The output of the CDR and deserializer block 348 may be sent to the RX Gearbox 350 within PMD PCS sublayer. The RX Gearbox 350 may be configured to perform an equivalent function, albeit in reverse, as the TX Gearbox 328.

The output of the RX gearbox 350 may be coupled to a frame synchronizer descrambler decoder block 352 embedded in the PMD PCS sublayer. The frame synchronizer function of the frame synchronizer descrambler decoder block 352 may be configured to monitor and detect frame boundaries, for example, a 66-bit frame boundary within the received data. The frame synchronizer function of the frame synchronizer descrambler decoder block 352 may lock to 66-bit blocks using a sync header within the 66-bit frame boundary. Once locked, the outputs of 66-bit data blocks may be determined. The descrambler function of the frame synchronizer descrambler decoder block 352 may be configured to process a payload for the received data. In this regard, the descrambler function of the frame synchronizer descrambler decoder block 352, may utilize the same polynomial employed by the scrambler function of the encoder scrambler block 326, to reverse any effects of scrambling. Subsequently, the decoder function of the frame synchronizer descrambler decoder block 352 may decode the blocks of received data. In one aspect of the invention, the decoder may be configured to decode the blocks of received data in accordance with the IEEE 805.3ae specification.

The output of the fame synchronizer descrambler decoder block 352 may be coupled to an elastic FIFO 354 located within the XGXS sublayer. The output of the elastic FIFO 354 may be coupled to a randomizer 356 located within the XGXS PCS sublayer. Randomizer 356 may be configured to reduce EMI during an inter-packet gap (IPG). At least some of the resultant idle patterns at the XAUI transmitters may be repetitive high-frequency signals, which may be due, for example, to at least some of the 8B/10B encoders. The randomizer 356 may output a random pattern, such as an /A/K/R/ pattern, in one or more of the data lanes during the IPG. The randomizer 356 may be configured to start its randomization processing on a column of the data containing, for example, an end-of-packet (EOP) byte (T), and end on a SOP. In one aspect of the invention, randomizer 356 may be adapted to utilize the polynomial, $1+x^3+x^7$ in compliance with the IEEE 802.3ae Draft 5.0 standard.

The output of the randomizer 356 may be coupled to one or more encoders, for example, 8B/10B encoders 358, located within the XGXS PCS sublayer. The 8B/10B encoders 358 may be adapted so that each of 8B/10B encoders may process a lane of data. In this case, the 8B/10B encoders 358 may be configured to convert a byte-wide data stream of random ones (1s) and zeros (0s) into, for example, a 10-bit DC-balanced serial stream of ones (1s) and zeros (0s). In one aspect of the invention, the DC-balanced serial stream of ones (1s) and zeros (0s) may have a maximum run length of about 6. Sufficient bit transitions may be provided, for example by software, to ensure reliable clock recovery.

Each of the outputs of the 8B/10B encoders may be coupled to an input of one or more serializers 360. In operation, data may be read out of the 8B/10B encoder 358 using for example, an internally generated clock. In one aspect of the invention, the internally generated clock may be configured to have a frequency of about 312.0-MHz clock. The data may then be converted to, for example, a 3 Gigabit serial stream within XAUI TX/RX sublayer and driven off-chip. Output pins XAOP, XAON, XDOP and XDON 362 may be configured to drive the output of serializers 360 off-chip. In one aspect of the invention, bit zero (0) of frame zero (0) or the LSB may be shifted out first and may be mapped to "A" of the 8B/10B encoder 358.

A XAUI CMU 346, which may be located within the XAUI TX/RX sublayer, may include a PLL that may have the capability to generate a clock signal such as the 3 Gigabit clock. For example, XAUI CMU 346 may have the capability of multiplying an internal 156.25 MHz reference clock to generate the 3 Gigabit clock. The single-chip multimode multi-sublayer PHY 130 may also include a lock detect circuit. The lock detect circuit may be configured to monitor a frequency of any internal VCO. In this regard, a CMU lock detect bit may be configured to transition to a high state whenever the XAUI CMU 346 PLL gets locked. The lock detect status may be indicated by one or more bits and/or registers, for example, bit 7 of the ATSR.

The XAUI serial outputs, XAOP, XAON, XDOP, XDON 362 may be AC-coupled CML outputs. In this regard, the XAUI serial outputs, XAOP, XAON, XDOP, XDON 362 CML outputs may be powered by for example, by a +1.2V voltage source. The XAUI serial outputs, XAOP, XAON, XDOP, XDON 362 may be adapted to be high-speed outputs and may include a differential pair designated to drive a 50 Ω transmission line. The output driver may be back terminated to 50 Ω on-chip resistor, which may provide snubbing of any signal reflections. The output driver may also be configured to possess pre-emphasis capability that may enable it to compensate for frequency selective attenuation of FR-4 traces. Advantageously, this may effectively compensate for any inter symbol interference (ISI) that may occur. The pre-emphasis capability may be controlled by one or more bits and/or registers such as a XAUI pre-emphasis controller register.

In one embodiment of the invention, various interfaces of the single-chip XAUI transmit block 310 and receive block 340 may have the capability to reverse the lane order and/or the lane polarity. Advantageously, XAUI I/O interface lane assignment package pins may be reversed to accommodate difficult PCB layouts. This capability may be controlled via one or more bits or registers such as a XAUI digital control register. In one aspect of the invention, a lane flipper may be configured to perform a byte-wise flip of any internal lane data. This may include, but is not limited to, 32-bit data. By default, lane "A" may be configured to carry byte zero (0), lane "B" may be configured to carry byte one (1), lane "C" may be configured to carry byte two (2), and lane "D" nay be configured to carry byte three (3).

In another embodiment of the invention, whenever the lane flipper is enabled, lane "A" may be configured to carry byte three (3), lane "B" may be configured to carry byte two (2), lane "C" may configured to carry byte one (1), and lane "D" may be configured to carry byte zero (0). In this regard, reversal of the lanes may be achieved by setting one or more bits and/or registers. For example, a bit such as a XAUI_TX_FLIP_B and a XAUI_RX_FLIP_B which may be located in a XAUI digital control register in the management registers and control interface block 372, may be set or cleared in order to reverse the XAUI lane order.

In yet a further embodiment of the invention, one or more XAUI I/O interface bit assignment (P to N) to package pins may be reversed in order to accommodate difficult PCB layouts. Assert bits such as a XAUI_TZ_INV and a XAUI_RX_INV bit, which may be located in a XAUI digital control register in the management registers and control interface block 372, may be set or cleared in order to reverse the XAUI lane polarity.

In accordance with the invention, the single-chip multimode multi-sublayer PHY 130 may be configured to support asynchronous clocking mode operation of the XAUI and PMD interfaces. The local reference clock or external transmit VCXO may be adapted to function in accordance with the IEEE specifications. In this regard, one or more elastic FIFO buffers may be configured to be an integral part of the asynchronous operation mode. For example, receive block 340 may include one or more elastic FIFOs 354 and the transmit block 310 may include one or more elastic FIFOs 324. The elastic FIFOs 354, 324 may be configured to accommodate a frequency difference of up to 200 ppm between a recovered clock and a local reference clock. The elastic FIFOs 354, 324 may have read and write pointers, which may be used for data access and manipulation. The Idle columns of data may be inserted or deleted during the IPG once the distance between the elastic FIFO's read and write pointers exceed a given threshold. In accordance with one aspect of the invention, idle columns of four bytes of data may be inserted or deleted during the IPG. In addition, a column of sequence orders may be deleted during the IPG once the distance between the elastic FIFO's read and write pointer exceed a threshold. In accordance with another aspect of the invention, the delete adjustments may occur on IPG streams that contain at least two columns of idles or sequence order sets.

Figure 4A:
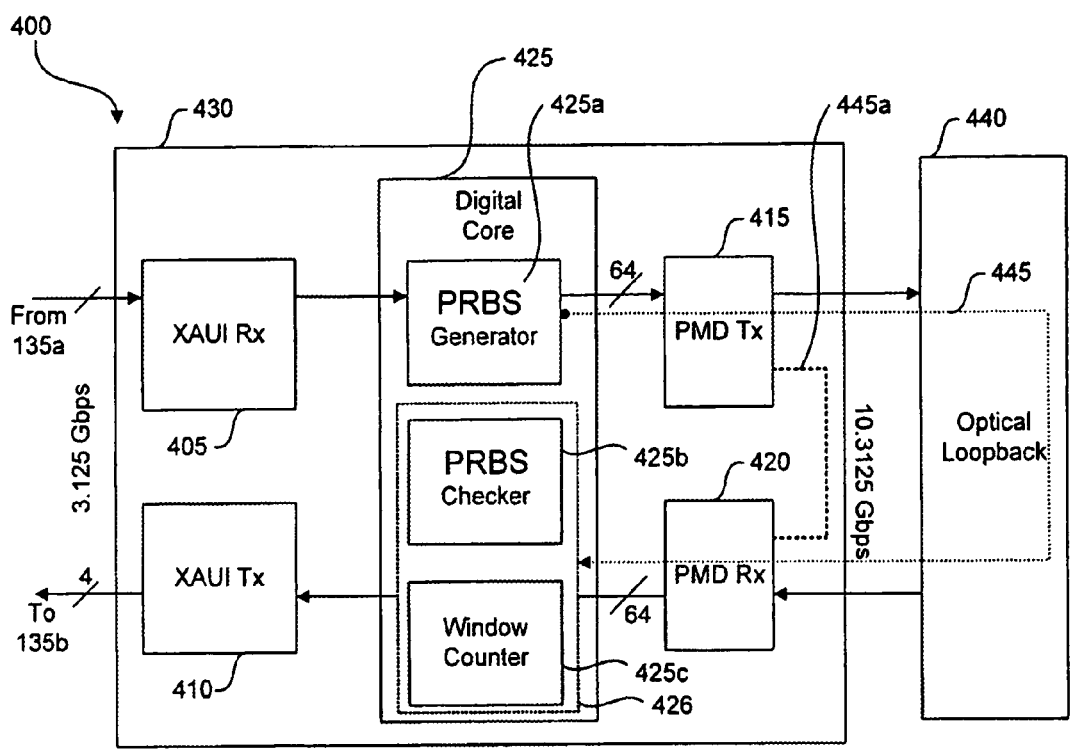
FIG. 4a is an exemplary block diagram of a single chip multi-sublayer PHY configured for bit error rate testing utilizing an optical loopback in accordance with one embodiment of the present invention.

FIG. 4a is an exemplary block diagram 400 of a single chip multi-sublayer PHY 430 configured for bit error rate testing utilizing an optical loopback 440 in accordance with one embodiment of the present invention. Referring to FIG. 4a, block diagram 400 may include a XAUI receiver 405, a XAUI transmitter 410, a digital core 425, a PMD transmitter 415 and a PMD receiver 420. An optical loopback 440 may be configured to form a communication channel or path between PMD transmitter 415 and the PMD receiver 420. In this regard, optical loopback 445 may include an electronic communication medium such as a fiber optic cable or link, a bus, an electronic device, or any combination thereof. In a one embodiment, the single-chip multimode sublayer PHY 430 may include one or more registers that may be configured to facilitate optical loopback. The optical loopback may be a closed communication path 445a within the PHY 430. In this regard, one or more bits may be set in one or more registers that may permit the PMD transmitter 415 and the PMD receiver 420 to be connected so that an output of PMD transmitter 415 may be connected to an input of PMD receiver 420 and an input of PMD transmitter 415 may be connected to an output of PMD receiver 420. This configuration may permit bit error rate testing of the PMD transmitter 415 and the PMD receiver 420 and the electrical loopback.

The PRBS generator 425a, the PRBS checker 425b, and the window counter 425c may be configured to facilitate on-chip bit error rate testing. PRBS generator 425a may generate a PRBS, which may be transmitted in a format such as a single 10 Gbps datastream by the PMD transmitter 415 across the optical loopback 440. The PRBS generator 425a may be configured to generate $2^{31}-1$ PRBSs. The PRBS checker 425b may maintain a copy of the PRBS, known as the expected bit stream, and may compare at least a portion of a received bit stream to at least a corresponding portion of the expected bit stream. When comparing the received bit stream to the expected bit stream, the PRBS checker 425b may determine the bit errors that are in the received bit stream. In this regard, the PRBS checker may count the number of bits that are in error in the bit stream. The window counter 425c may be configured to count the number of bits in the received bit stream. A bit error rate may be determined according to the number of bit errors counted by the PRBS checker 425b and the number of bits in the received bit stream, using the following formula:

BER=[Number of Bit Errors Counted]/[Number of Bits in Bit Stream]

The window counter 425c may be programmed with the number of bits for testing. The PRBS generator 425a may generate a PRBS that may be transmitted by the PMD transmitter 415 via the optical loopback 440. The PMD receiver 420 may receive a bit sequence associated with the PRBS. A test path 445 may indicate the path traversed by the PRBS. Test path 445 may originate at the PRBS generator 425a, then pass through PMD transmitter 415, across optical loopback 440, then pass through the PMD receiver 420, and finally ends at the window counter/PRBS checker 526. Accordingly, the bit error rate may be determined for the test path 445.

The window counter 425c may be configured to keep a running count of the bits as they are received. As the bits are received, they may be tallied by the window counter 425c. The PRBS checker 425b may compare the bits in the received bit sequence received at PMD receiver 420 with the bits in the expected bit sequence, until the window counter 425c indicates that the number of bits for testing has been received. While comparing the received bits with the expected bits, the window counter 425c may count the number of bits that are in error. Once the number of bits for testing has been received, the bit error rate may be determined based on a ratio of the number of bit errors counted to the number of bits for testing.

Figure 4B:
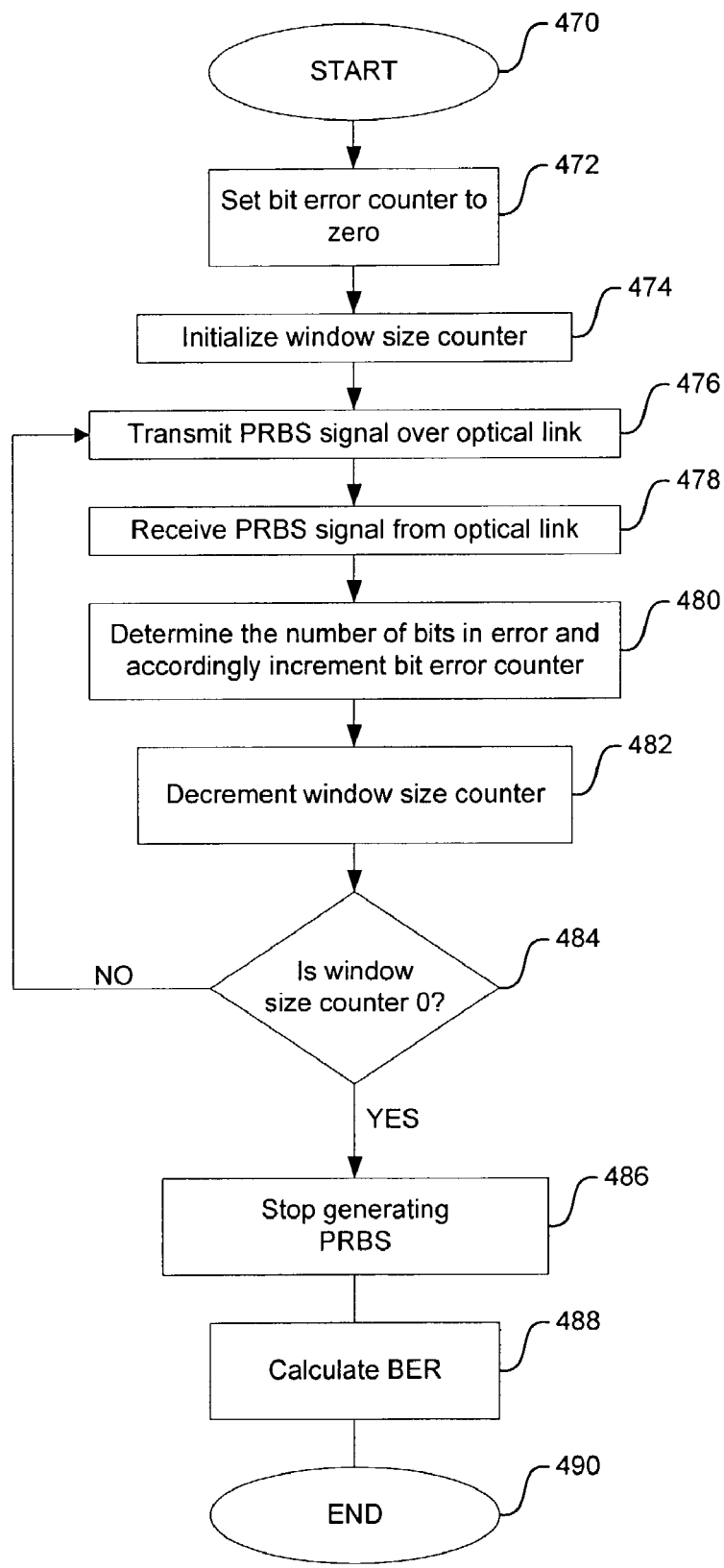

FIG. 4b is a flow chart describing exemplary steps that may be used to determine bit error rate in accordance with the embodiment of the invention as described in FIG. 4a. Referring to FIG. 4b, the steps may start with step 470. In step 472, a bit error counter may be set to zero (0). In step 474, a window size counter may be initialized to the number of bits that are to be checked. In step 476, a PRBS signal may be transmitted over an optical link. In step 478, the transmitted signal may be received from the optical link. In step 480, the number of bits in error may be determined. In step 482, the window size counter may be decremented. In step 484, a decision may be made whether the window size counter is zero (0). If the window size counter is zero (0), then in step 486, signal may be sent indicating that that PRBS generator 425a may terminate the generation of the PRBS. In step 488, the BER error rate may be calculated based on the number of bits generated and the number of bits in error. The steps may end at step 490. Returning to step 484, if the window size counter is not equal to zero (0), then the steps starting at step 476 may be re-executed.

Figure 5:
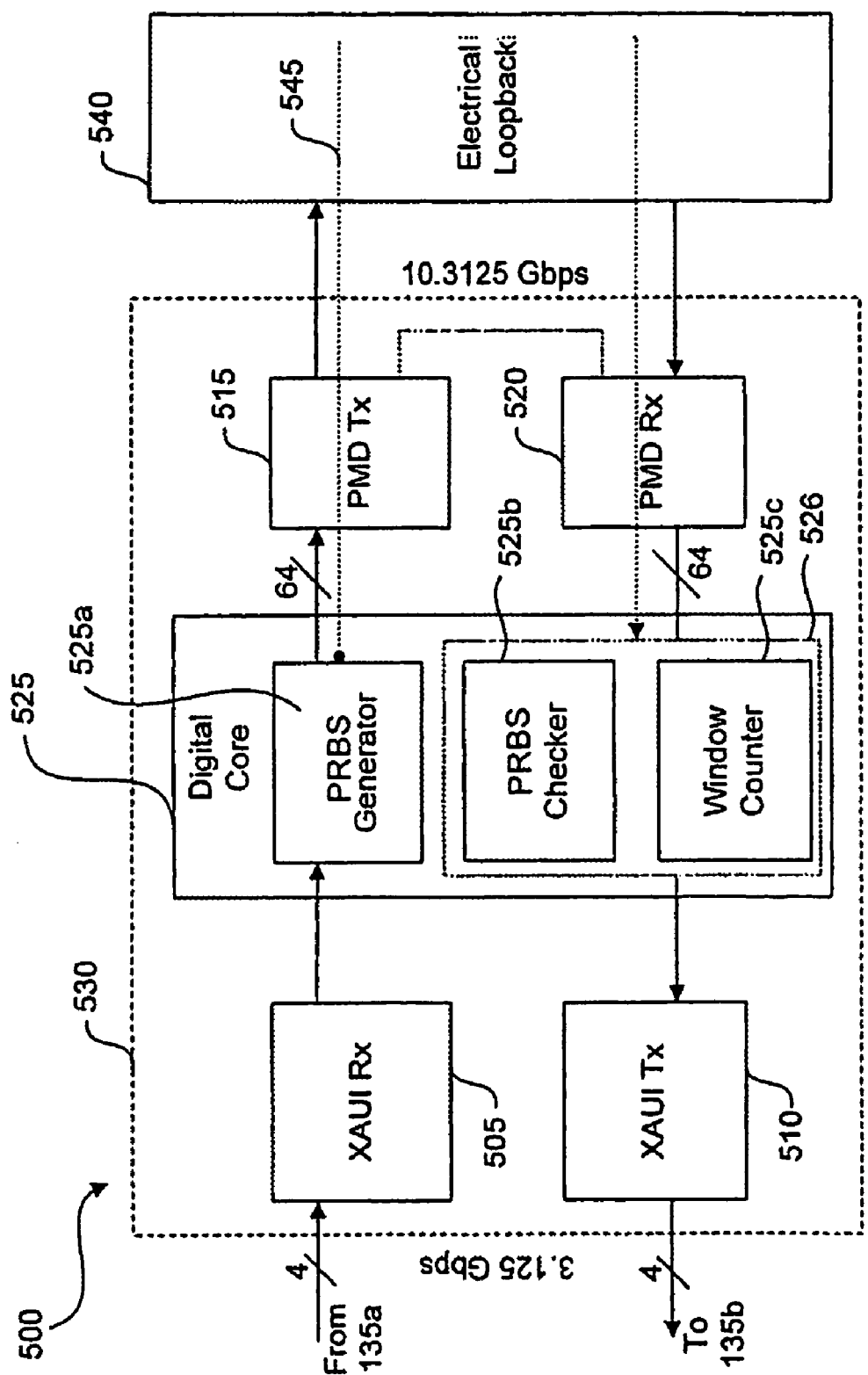
FIG. 5 is an exemplary block diagram of a single chip multi-sublayer PHY configured for bit error rate testing utilizing an electrical loopback in accordance with one embodiment of the present invention.

FIG. 5 is an exemplary block diagram 500 of a single chip multi-sublayer PHY 530 configured for bit error rate testing utilizing an electrical loopback 540 in accordance with one embodiment of the present invention. Referring to FIG. 5, block diagram 500 may include a XAUI receiver 505, a XAUI transmitter 510, a digital core 525, a PMD transmitter 515 and a PMD receiver 520. An electrical loopback 540 may be configured to form a communication channel or path between PMD transmitter 515 and the PMD receiver 520. In this regard, optical loopback 545 may include an electronic communication medium such as a copper wire, or coaxial cable, a bus, an electronic device, or any combination thereof. In a one embodiment, the single-chip multimode sublayer PHY 530 may include one or more registers that may be configured to facilitate electrical loopback. In this regard, one or more bits may be set in one or more of the registers in order to permit an output of the PMD transmitter 515 to be connected to an input of the PMD receiver 520 and an input of the PMD transmitter 515 to be connected to an output of the PMD receiver 520. This configuration may permit bit error rate testing of the PMD transmitter 515 and the PMD receiver 520 and the electrical loopback.

The PRBS generator 525a, the PRBS checker 525b, and the window counter 525c may be configured to facilitate on-chip bit error rate testing. PRBS generator 525a may generate a PRBS, which may be transmitted in a format such as a single 10 Gbps datastream by the PMD transmitter 515 across the electrical loopback 540. This may be considered the transmit path. Data from the electrical loopback 540 may be received at PMD receiver 520 and forwarded to the window counter/PRBS checker 526. This may be considered the receive path. The PRBS generator 525a may be configured to generate $2^{31}-1$ PRBSs. The PRBS checker 525b may maintain a copy of the PRBS, known as the expected bit stream, and may compare at least a portion of a received bit stream to at least a corresponding portion of the expected bit stream. When comparing the received bit stream to the expected bit stream, the PRBS checker 525b may determine the bit errors that are in the received bit stream. In this regard, the PRBS checker may count the number of bits that are in error in the bit stream. The window counter 525c may be configured to count the number of bits in the received bit stream. A bit error rate may be determined according to the number of bit errors counted by the PRBS checker 525b and the number of bits in the received bit stream, using the following formula:

BER=[Number of Bit Errors Counted]/[Number of Bits in Bit Stream]

The window counter 525c may be programmed with the number of bits for testing. The PRBS generator 525a may generate a PRBS that may be transmitted by the PMD transmitter 515 via the electrical loopback 540. The PMD receiver 520 may receive a bit sequence associated with the PRBS. A test path 545 may indicate the path traversed by the PRBS. Test path 545 may originate at the PRBS generator 425a, then pass through PMD transmitter 515, across electrical loopback 540, then pass through the PMD receiver 520, and finally end at the integrated window counter/PRBS checker 526. Accordingly, the bit error rate may be determined for the test path 545.

The window counter 525c may be configured to keep a running count of the bits as they are received. As the bits are received, they may be tallied by the window counter 525c. The PRBS checker 525b may compare the bits in the received bit sequence received at PMD receiver 520 with the bits in the expected bit sequence, until the window counter 525c indicates that the required number of bits for testing has been received. While comparing the received bits with the expected bits, the window counter 525c may count the number of bits that are in error. Once the number of bits for testing has been received, the bit error rate may be determined based on a ratio of the number of counted bit errors to the number of bits for testing.

Figure 6:
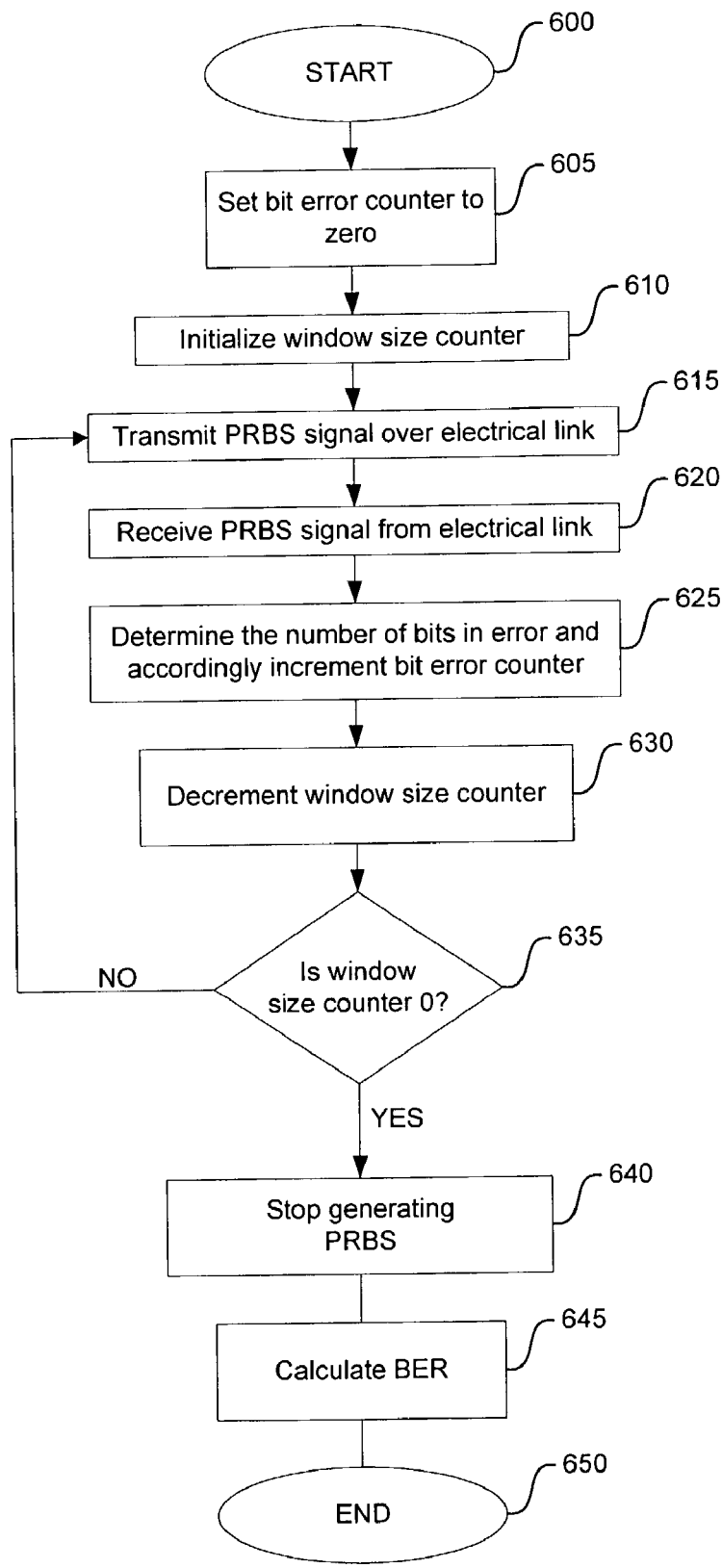
FIG. 6 is a flow chart describing exemplary steps that may be used to determine bit error rate in accordance with the embodiment of the invention as described in FIG. 5.

FIG. 6 is a flow chart describing exemplary steps that may be used to determine bit error rate in accordance with the embodiment of the invention as described in FIG. 5. Referring to FIG. 6, the steps may start with step 600. In step 605, a bit error counter may be set to zero (0). In step 610, a window size counter may be initialized to the number of bits that are to be checked. In step 615, a PRBS signal may be transmitted over an electrical link. In step 620, the transmitted signal may be received from the electrical link. In step 625, the number of bits in error may be determined. In step 630, the window size counter may be decremented. In step 635, a decision may be made whether the window size counter is zero (0). If the window size counter is zero (0), then in step 640, signal may be sent indicating that that PRBS generator 525*a* may terminate the generation of the PRBS. In step 645, the BER error rate may be calculated based on the number of bits generated and the number of bits in error. The steps may end at step 650. Returning to step 635, if the window size counter is not equal to zero (0), then the steps starting at step 615 may be re-executed.

Figure 7:
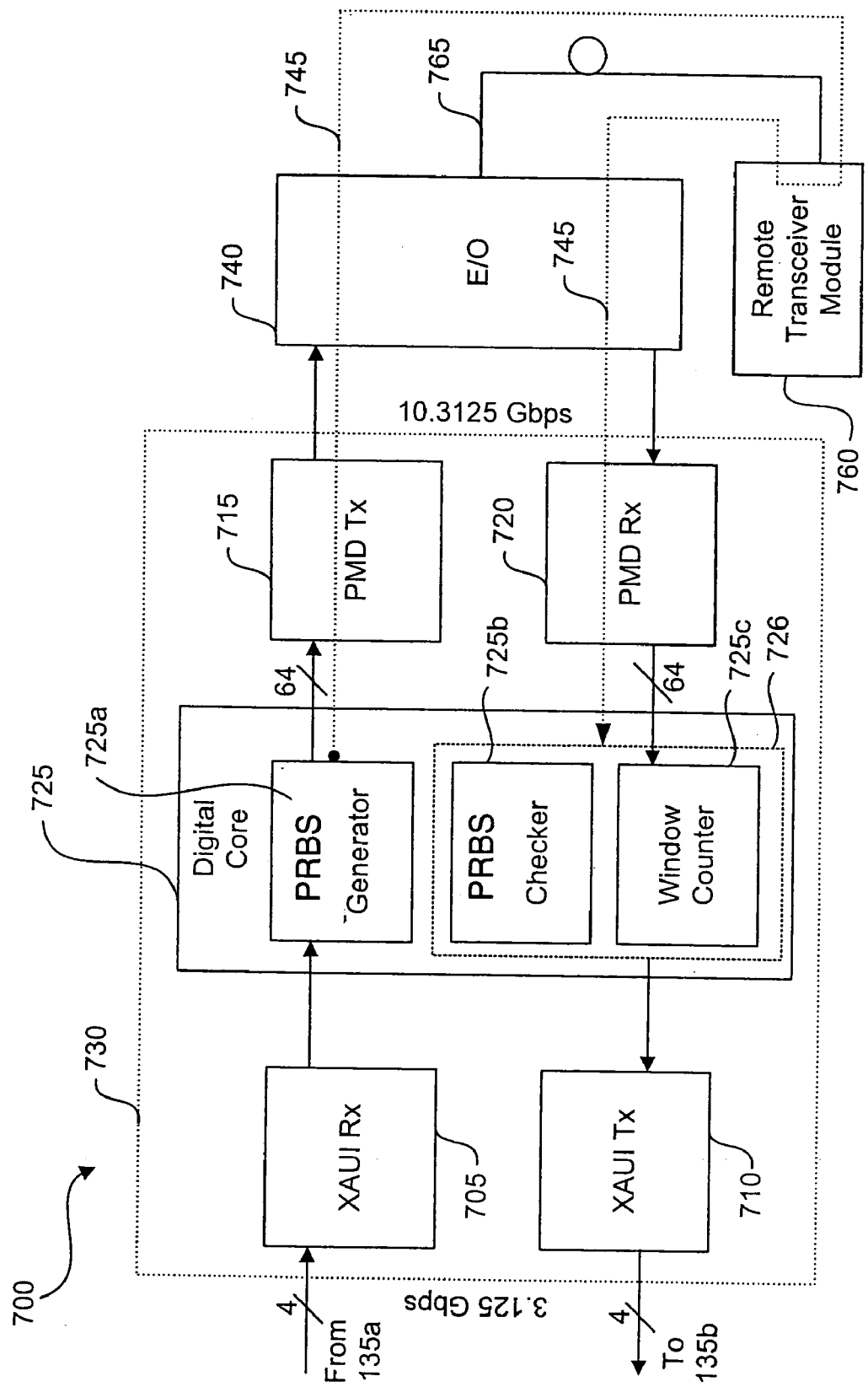
FIG. 7 is a block diagram of an exemplary configuration for bit error rate testing for a test path, which includes an optical link and a remote transceiver module connected thereto in accordance with an embodiment of the present invention.

FIG. 7 is a block diagram 700 of an exemplary configuration for bit error rate testing for a test path, which includes an optical link and a remote transceiver module connected thereto in accordance with an embodiment of the present invention. Referring to FIG. 7, block diagram 700 may include a XAUI receiver 705, a XAUI transmitter 710, a digital core 725, a PMD transmitter 715 and a PMD receiver 720. An electro/optical interface 740 and optical link 765 may be configured to form a communication channel or path between PMD transmitter 715, PMD receiver 720 and remote transceiver module 760. In a one embodiment, the remote transceiver module 760 may include one or more registers that may be configured to facilitate electrical loopback. In this regard, the bits may be set in one or more of the registers in order to permit an output of the PMD transmitter 715 to be connected to an input of the remote transceiver module 760 and an input of the PMD transmitter 715 to be connected to an output of the remote transceiver module 760. This configuration may permit bit error rate testing of the PMD transmitter 715, the PMD receiver 720, the electro/optical interface 740, optical link 765 and the remote transceiver module 760.

In operation, PRBS generator 725*a* may generate a PRBS, which may be transmitted in a format such as a single 10 Gbps datastream by the PMD transmitter 715 to the remote transceiver module 760 over optical link 765. This may be considered the transmit path. Data from the remote transceiver module 760 may be transmitted over optical link 765 across electro/optical interface 740 and received at PMD receiver 720. This may be considered the receive path. The remote transceiver module 760 may include another single chip multi-sublayer PHY, which may be configured to operate in loopback mode. In this arrangement, bit error rate testing may be conducted over path 745 which may originate at the output of the PRBS generator 725*a*, traverses through PMD transmitter 715, across optical link 765, loopback through remote transceiver module 760, back across optical link 765, traverses through PMD receiver 720 to 726.

The window counter 725*c* may be programmed with the number of bits for testing. The PRBS generator 725*a* may generate a PRBS signal that may be transmitted by the PMD transmitter 715 over the electrical/optical (E/O) interface 740, optical link 765, and the remote transceiver module 760. After the PRBS signal is loopbacked in the remote transceiver 760, the PMD receiver 720 may receive a bit sequence associated with the PRBS. Window counter 725*c* may be configured to count the bits received. The PRBS checker 725*b* may compare at least a portion of the PRBS signal it receives with the expected bit sequence and counts the number of bits that may be in error. This may continue until there is an indication that all the bits required for testing has been received. In one aspect of the invention, window counter 725*c* may be configured to maintain a counter that may indicate when the required number of bits for testing has been received. When the number of bits for testing has been received, the bit error rate may be determined based on a ratio of the number of counted bit errors to the number of bits that were used for testing.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the essential attributes or scope of the invention. In addition, various modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for determining a bit error rate for a physical layer device, wherein the physical layer device is a layer 1 device of an Open Systems Interconnection (OSI) model, the method comprising:
   establishing a closed communication path within the physical layer device;
   generating test packets within the physical layer device to be communicated over said established closed communication path;
   receiving at least a portion of said generated test packets within the physical layer device; and
   comparing within the physical layer device, at least a portion of said received test packets with at least a portion of said generated test packets in order to determine the bit error rate for the physical layer device.

2. The method according to claim 1, wherein said establishing step further comprises:
   connecting a transmit path of the physical layer device to a receive path of the physical layer device; and
   connecting a receive path of the physical layer device to a transmit path of the physical layer device.

3. The method according to claim 2, wherein said step of connecting said transmit path and said step of connecting said receive path further comprises configuring the physical layer device to operate in an optical loopback mode.

4. The method according to claim 2, wherein said step of connecting said transmit path and said step of connecting said receive path further comprises configuring the physical layer device to operate in an electrical loopback mode.

5. The method according to claim 1, wherein said generating step further comprises transmitting said generated test packets from a transmitter within the physical layer device over said closed communication path to a receiver within the physical layer device.

6. The method according to claim 1, wherein said test packets comprises a pseudo-random bit sequence.

7. The method according to claim 1, wherein said receiving step further comprises counting at least a portion of a number of bits received within said generated test packets.

8. The method according to claim 7, wherein said comparing step further comprises:
counting a number of bits that are in error in said at least a portion of said number of bits received; and
calculating the bit error rate according to a ratio of said number of counted bits in error to said number bits counted in said at least a portion of said number of bits received.

9. A method for determining a bit error rate for a physical layer device, wherein the physical layer device is a layer 1 device of an Open Systems Interconnection (OSI) model, the method comprising:
establishing a closed communication path between the physical layer device and a remote physical layer device;
generating test packets within the physical layer device to be communicated over said established closed communication path;
receiving at least a portion of said test packets from the remote physical layer device within the physical layer device; and
comparing within the physical layer device, at least a portion of said received test packets with at least a portion of said generated test packets, to determine the bit error rate for the physical layer device.

10. The method according to claim 9, wherein said establishing step further comprises connecting an output of the physical layer device to an input of said remote physical layer device and an output of said remote physical layer device to an input of the physical layer device.

11. The method according to claim 10, wherein said connecting step further comprises:
connecting a transmit path of said physical layer device to a receive path of said remote physical layer device; and
connecting a receive path of said physical layer device to a transmit path of said remote physical layer device.

12. The method according to claim 11, further comprising configuring said remote physical layer device to operate in an electrical loopback mode.

13. The method according to claim 11, further comprising configuring said remote physical layer device to operate in an optical loopback mode.

14. The method according to claim 9, wherein said generating step further comprises transmitting said generated test packets from a transmitter within the physical layer device over said closed communication path to said remote physical layer device.

15. The method according to claim 9, wherein said test packets comprises a pseudo-random bit sequence.

16. The method according to claim 9, wherein said receiving step further comprises:
receiving at a receiver within the physical layer device, at least a portion of said generated test packets from a transmitter within said remote physical layer device over said closed communication; and
counting a number of bits in said at least a portion of said generated test packets received at said receiver.

17. The method according to claim 16, wherein said comparing step further comprises:
counting a number of bits that are in error in said at least a portion of said number of bits received at said receiver; and
calculating the bit error rate according to a ratio of said number of counted bits in error to said number of bits counted in said at least a portion of said number of bits received at said receiver.

18. A machine-readable storage medium, having stored thereon a computer program having at least one code section executable by a machine for causing the machine to perform the steps comprising:
establishing a closed communication path within a physical layer device for determining a bit error rate for said physical layer device, wherein the physical layer device is a layer 1 device of an Open Systems Interconnection (OSI) model;
generating test packets within said physical layer device to be communicated over said established closed communication path;
receiving at least a portion of said generated test packets within said physical layer device; and
comparing within said physical layer device, at least a portion of said received test packets with at least a portion of said generated test packets in order to determine the bit error rate for said physical layer device.

19. The machine-readable storage medium according to claim 18, wherein said at least one establishing code section further comprises:
connecting a transmit path of said physical layer device to a receive path of the physical layer device; and
connecting a receive path of said physical layer device to a transmit path of the physical layer device.

20. The machine-readable storage medium according to claim 19, wherein said at least one code section for connecting said transmit path and said step of connecting said receive path further comprises configuring said physical layer device to operate in an optical loopback mode.

21. The machine-readable storage medium according to claim 19, wherein said at least one code section for connecting said transmit path and said step of connecting said receive path further comprises configuring said physical layer device to operate in an electrical loopback mode.

22. The machine-readable storage medium according to claim 18, wherein said at least one generating code section further comprises transmitting said generated test packets from a transmitter within said physical layer device over said closed communication path to a receiver within said physical layer device.

23. The machine-readable storage medium according to claim 18, wherein said test packets comprise a pseudo-random bit sequence.

24. The machine-readable storage medium according to claim 18, wherein said at least one receiving code section further comprises counting at least a portion of a number of bits received within said generated test packets.

25. The machine-readable storage medium according to claim 24, wherein said at least one comparing code section further comprises:
counting a number of bits that are in error in said at least a portion of said number of bits received; and calculating the bit error rate according to a ratio of said number of counted bits in error to said number of bits counted in said at least a portion of said number of bits received.

26. A machine-readable storage medium, having stored thereon a computer program having a at least one code section executable by a machine for causing the machine to perform the steps comprising:

establishing a closed communication path between a physical layer device and a remote physical layer device for determining a bit error rate for said physical layer device, wherein the physical layer device is a layer 1 device of an Open Systems Interconnection (OSI) model;

generating test packets within said physical layer device to be communicated over said established closed communication path;

receiving at least a portion of said test packets from said remote physical layer device within said physical layer device; and comparing within said physical layer device, at least a portion of said received test packets with at least a portion of said generated test packets, to determine the bit error rate for said physical layer device.

27. The machine-readable storage medium according to claim 26, wherein said at least one establishing code section further comprises connecting an output of the physical layer device to an input of said remote physical layer device and an output of said remote physical layer device to an input of the physical layer device.

28. The machine-readable storage medium according to claim 27, wherein said at least one connecting code section further comprises:

connecting a transmit path of said physical layer device to a receive path of said remote physical layer device; and connecting a receive path of said physical layer device to a transmit path of said remote physical layer device.

29. The machine-readable storage medium according to claim 28, further comprising said at least one section for configuring said remote physical layer device to operate in an electrical loopback mode.

30. The machine-readable storage medium according to claim 28, further comprising said at least one code section for configuring said remote physical layer device to operate in an optical loopback mode.

31. The machine-readable storage medium according to claim 26, wherein said at least one generating code section further comprises transmitting said generated test packets from a transmitter within said physical layer device over said closed communication path to said remote physical layer device.

32. The machine-readable storage medium according to claim 26, wherein said test packets comprises a pseudo-random bit sequence.

33. The machine-readable storage medium according to claim 26, wherein said at least one receiving code section further comprises:

receiving at a receiver within said physical layer device, at least a portion of said generated test packets from a transmitter within said remote physical layer device over said closed communication; and counting a number of bits in said at least a portion of said generated test packets received at said receiver.

34. The machine-readable storage medium according to claim 33, wherein said at least one comparing code section further comprises:

counting a number of bits that are in error in said at least a portion of said number of bits received at said receiver; and calculating the bit error rate according to a ratio of said number of counted bits in error to said number bits counted in said at least a portion of said number of bits received at said receiver.

35. A system for determining a bit error rate for a physical layer device, wherein the physical layer device is a layer 1 device of an Open Systems Interconnection (OSI) model, the system comprising:

means for establishing a closed communication path within the physical layer device;

means for generating test packets within the physical layer device to be communicated over said established closed communication path;

means for receiving at least a portion of said generated test packets within the physical layer device; and means for comparing within the physical layer device, at least a portion of said received test packets with at least a portion of said generated test packets in order to determine the bit error rate for the physical layer device.

36. The system according to claim 35, wherein said establishing means further comprises:

means for connecting a transmit path of the physical layer device to a receive path of the physical layer device; and means for connecting a receive path of the physical layer device to a transmit path of the physical layer device.

37. The system according to claim 36, wherein said means for connecting said transmit path and said means for connecting said receive path further comprises means for configuring the physical layer device to operate in an optical loopback mode.

38. The system according to claim 36, wherein said means for connecting said transmit path and said means for connecting said receive path further comprises means for configuring the physical layer device to operate in an electrical loopback mode.

39. The system according to claim 35, wherein said generating means further comprises means for transmitting said generated test packets from a transmitter within the physical layer device over said closed communication path to a receiver within the physical layer device.

40. The system according to claim 35, wherein said test packets comprise a pseudo-random bit sequence.

41. The system according to claim 35, wherein said receiving means further comprises means for counting at least a portion of a number of bits received within said generated test packets.

42. The system according to claim 41, wherein said comparing means further comprises:

means for counting a number of bits that are in error in said at least a portion of said number of bits received; and means for calculating the bit error rate according to a ratio of said number of counted bits in error to said number of bits counted in said at least a portion of said number of bits received.

43. A system for determining a bit error rate for a physical layer device, wherein the physical layer device is a layer 1 device of an Open Systems Interconnection (OSI) model, the system comprising:

means for establishing a closed communication path between the physical layer device and a remote physical layer device;

means for generating test packets within the physical layer device to be communicated over said established closed communication path;

means for receiving at least a portion of said test packets from the remote physical layer device within the physical layer device; and means for comparing within the physical layer device, at least a portion of said received test packets with at least a portion of said generated test packets, to determine the bit error rate for the physical layer device.

44. The system according to claim 43, wherein said establishing step further comprises at least one means for connecting an output of the physical layer device to an input of said remote physical layer device and said at least one means for connecting an output of said remote physical layer device to an input of the physical layer device.

45. The system according to claim 44, wherein said connecting means further comprises:

means for connecting a transmit path of said physical layer device to a receive path of said remote physical layer device; and means for connecting a receive path of said physical layer device to a transmit path of said remote physical layer device.

46. The system according to claim 45, further comprising means for configuring said remote physical layer device to operate in an electrical loopback mode.

47. The system according to claim 45, further comprising means for configuring said remote physical layer device to operate in an optical loopback mode.

48. The system according to claim 43, wherein said generating means further comprises means for transmitting said generated test packets from a transmitter within the physical layer device over said closed communication path to said remote physical layer device.

49. The system according to claim 43, wherein said test packets comprises a pseudo-random bit sequence.

50. The system according to claim 43, wherein said receiving means further comprises:

means for receiving at a receiver within the physical layer device, at least a portion of said generated test packets from a transmitter within said remote physical layer device over said closed communication; and means for counting a number of bits in said at least a portion of said generated test packets received at said receiver.

51. The system according to claim 50, wherein said comparing means further comprises:

means for counting a number of bits that are in error in said at least a portion of said number of bits received at said receiver; and means for calculating the bit error rate according to a ratio of said number of counted bits in error to said number of bits counted in said at least a portion of said number of bits received at said receiver.

52. A system for determining a bit error rate of a physical layer device, wherein the physical layer device is a layer 1 device of an Open Systems Interconnection (OSI) model, the system comprising:

a test packet generator within the physical layer device for generating test packets to be communicated over a closed communication path established within the physical layer device;

a receiver for receiving at least a portion of said generated test packets within the physical layer device; and a test packet checker within the physical layer device for comparing at least a portion of said received test packets with at least a portion of said generated test packets in order to determine the bit error rate for the physical layer device.

53. The system according to claim 52, further comprising a loopback interface for connecting a transmit path of the physical layer device to a receive path of the physical layer device and for connecting a receive path of the physical layer device to a transmit path of the physical layer device.

54. The system according to claim 53 wherein at least one bit is a register bit used to configure said loopback interface.

55. The system according to claim 53, wherein said loopback interface further comprises an optical loopback.

56. The system according to claim 53, wherein said loopback interface further comprises an electrical loopback.

57. The system according to claim 52, wherein said test packets comprises a pseudo-random bit sequence.

58. The system according to claim 52, further comprising a counter within the physical layer device for counting at least a portion of a number of bits received within said generated test packets, counting a number of bits that are in error in said at least a portion of said number of bits received and calculating the bit error rate according to a ratio of said number of counted bits in error to said number bits counted in said at least a portion of said number of bits received.

59. A system for determining a bit error rate for a physical layer device, wherein the physical layer device is a layer 1 device of an Open Systems Interconnection (OSI) model, the system comprising:

a test packet generator within the physical layer device for generating test packets to be communicated over a established closed communication path between the physical layer device and a remote physical layer device;

a receiver within the physical layer device for receiving at least a portion of said test packets from said remote physical layer device; and a test packet checker within the physical layer device for comparing at least a portion of said received test packets with at least a portion of said generated test packets to determine the bit error rate for the physical layer device.

60. The system according to claim 59, further comprising an interface for connecting an output of the physical layer device to an input of said remote physical layer device and an output of said remote physical layer device to an input of the physical layer device.

61. The system according to claim 60, wherein said interface is an interface selected from the group consisting of an optical interface, an electrical interface, and an optical-electrical interface.

62. The system according to claim 59, wherein said remote physical layer device further comprises a loopback interface, wherein at least one bit is a register bit used to configure said remote physical layer device to operate in a loopback mode.

63. The system according to claim 59, wherein said test packets comprises a pseudo-random bit sequence.

64. The system according to claim 59, further comprising a counter within the physical layer device for counting at least a portion of a number of bits received within said generated test packets, counting a number of bits that are in error in said at least a portion of said number of bits received and calculating the bit error rate according to a ratio of said number of counted bits in error to said number of bits counted in said at least a portion of said number of bits received.

* * * * *